Oct. 26, 1965     S. J. BOND     3,214,765
ELECTRONIC PLOTTER FOR MULTIPLE TARGET TRACKING
Filed June 20, 1961     4 Sheets-Sheet 1
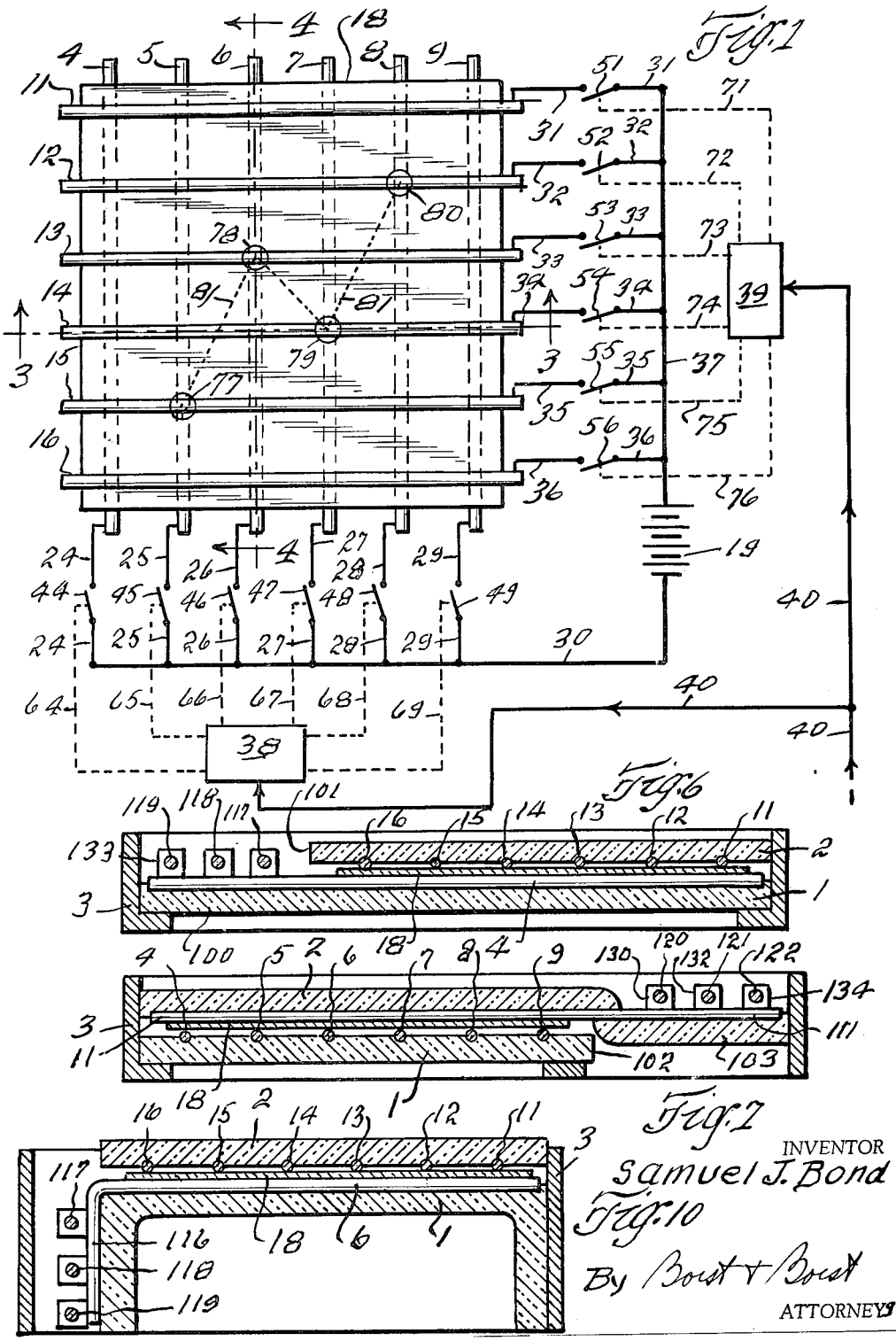
INVENTOR
Samuel J. Bond
By Boust & Boust
ATTORNEY

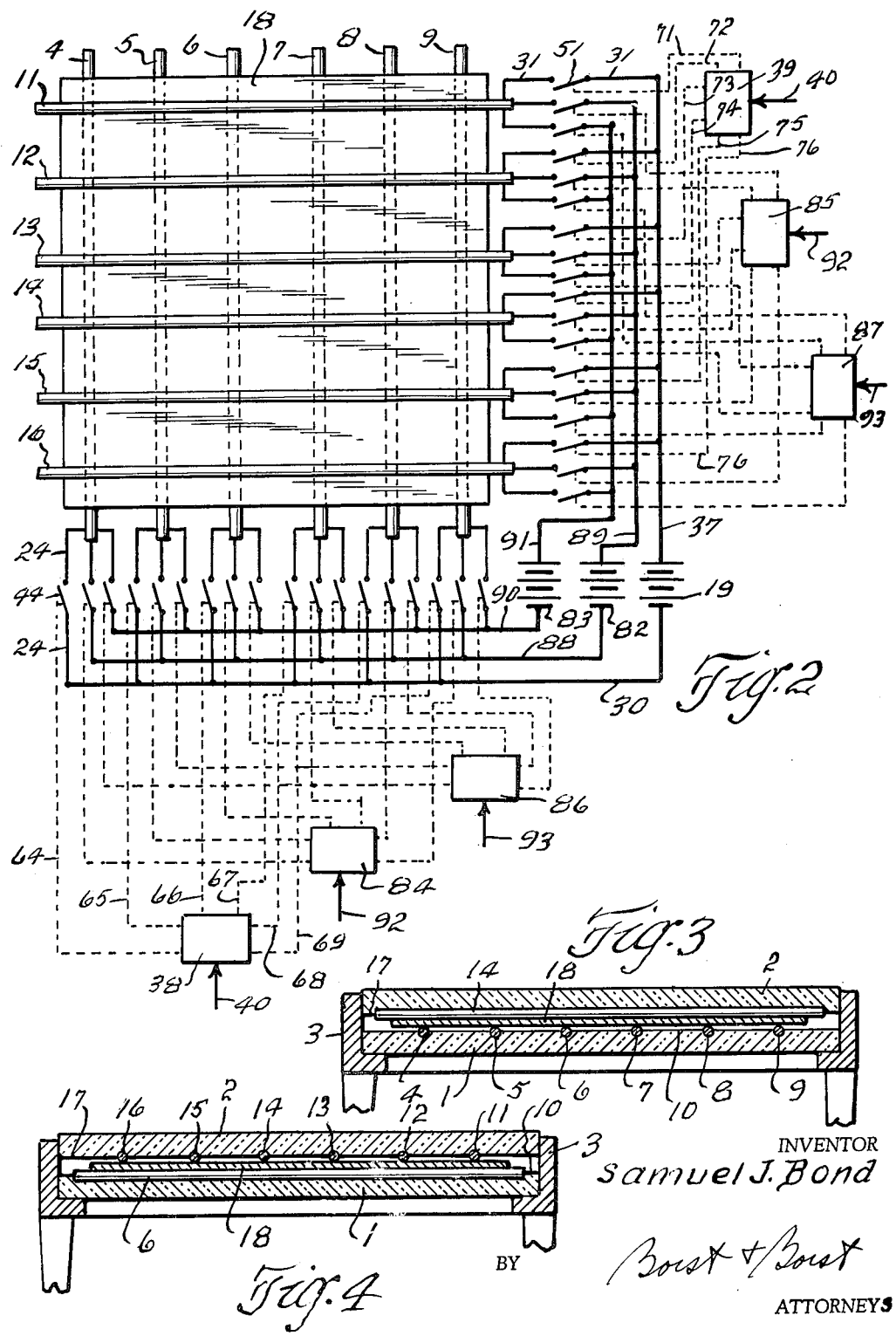

Oct. 26, 1965　　　　S. J. BOND　　　　3,214,765
ELECTRONIC PLOTTER FOR MULTIPLE TARGET TRACKING
Filed June 20, 1961　　　　　　　　　　4 Sheets-Sheet 3
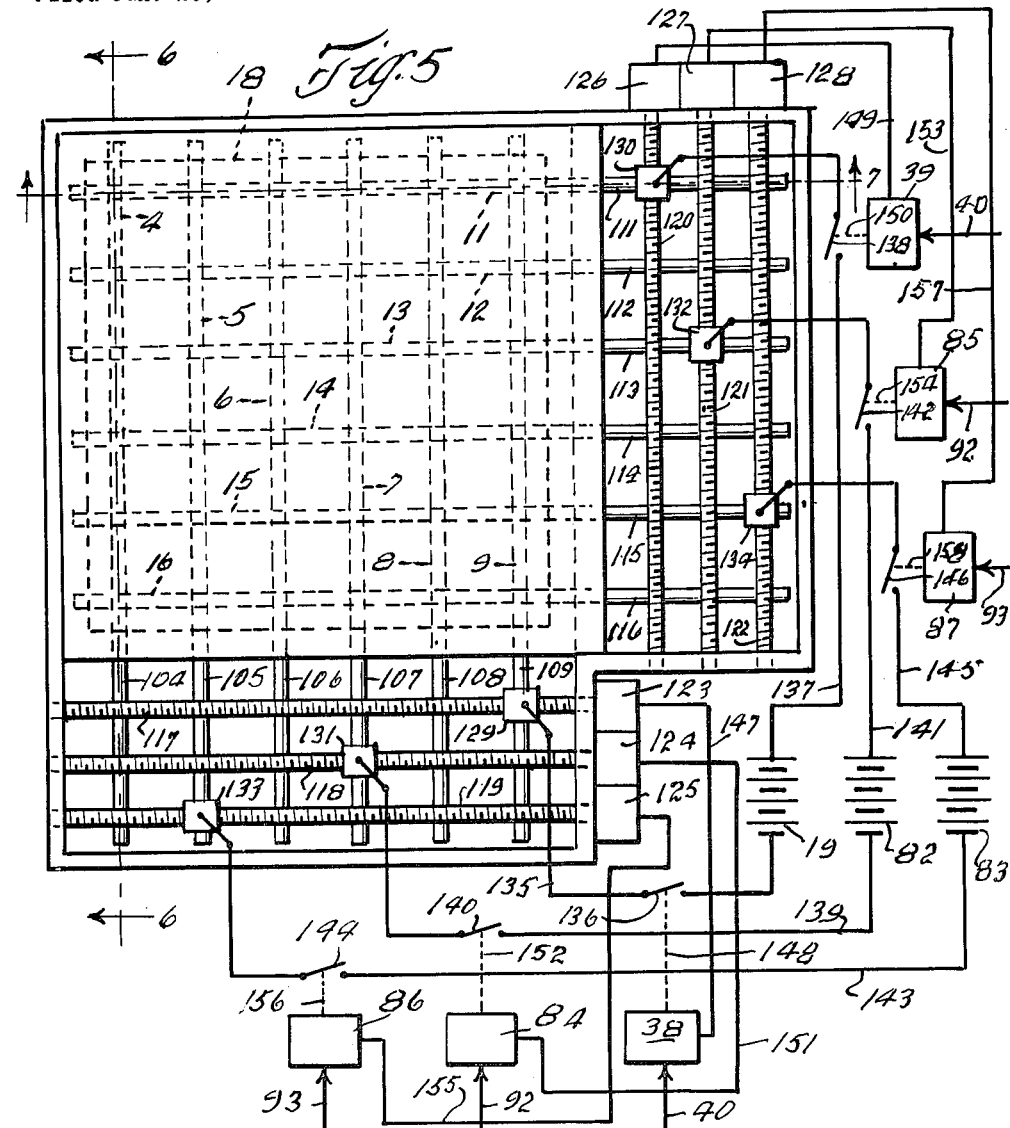
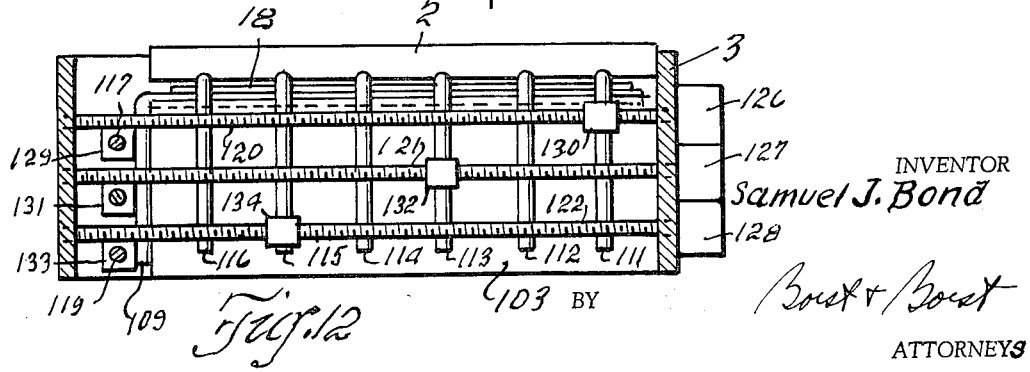
INVENTOR
Samuel J. Bond
BY Borst & Borst
ATTORNEYS Oct. 26, 1965     S. J. BOND     3,214,765
ELECTRONIC PLOTTER FOR MULTIPLE TARGET TRACKING
Filed June 20, 1961     4 Sheets-Sheet 4
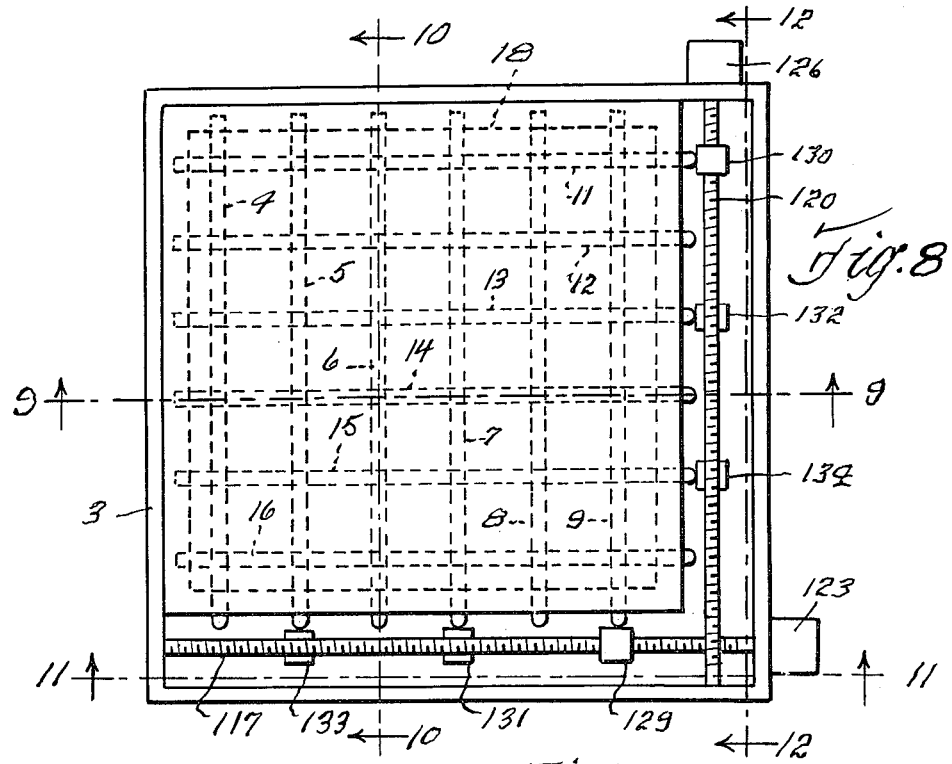
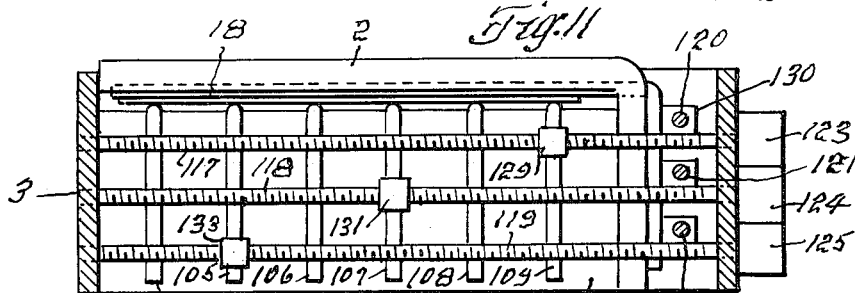
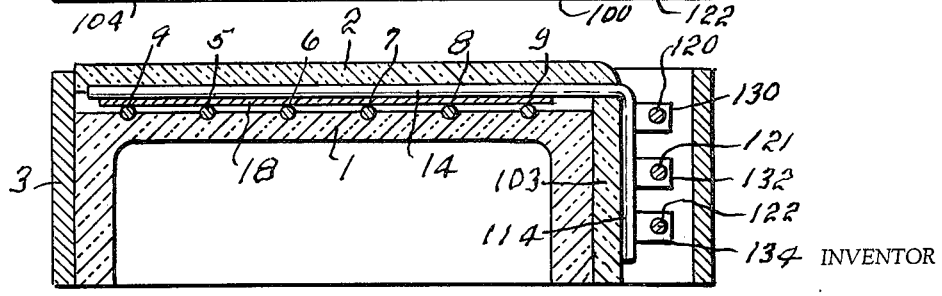
INVENTOR
Samuel J. Bond
BY
ATTORNEYS

United States Patent Office 3,214,765
Patented Oct. 26, 1965

3,214,765
ELECTRONIC PLOTTER FOR MULTIPLE
TARGET TRACKING
Samuel J. Bond, Jackson Heights, N.Y., assignor to Sperry
Rand Corporation, Ford Instrument Company Division,
Long Island City, N.Y., a corporation of Delaware
Filed June 20, 1961, Ser. No. 118,360
1 Claim. (Cl. 346—74)

This invention relates to an electric plotting mechanism by which a plurality of graphs may be simultaneously plotted at electronically high speed on a sheet of sensitized paper in accordance with information supplied thereto through associated computing means. The mechanism is especially adapted for plotting the courses of multiple targets in a weapons range evaluation center; but it can be used equally well for graphically plotting various other types of information especially where simultaneous multiple plotting is desired.

Prior mechanisms for graphically plotting various different channels of information all required the storing of the information received, which was then later plotted, one piece at a time, until all of stored information was plotted.

In accordance with the present invention many different channels of information may be simultaneously plotted as the information is received, which eliminates the storing of the information and the consequent loss of time, which is most objectionable in a military tactical situation.

It is therefore one of the principal objects of the invention to provide a plotting mechanism by which a plurality of channels of information may be simultaneously electrically plotted as the information is received, thereby eliminating the need for information storage mechanisms.

Another object of the invention is to provide a plotting mechanism of the aforesaid character which is of simple trouble free construction and is very efficient in operation.

The mechanism of the invention comprises generally a bottom, or base plate, which is adapted to be secured in a supporting frame, and a movable top plate which is adapted to be placed over the bottom plate. Both of these plates are preferably composed of suitable transparent electric insulating material. The bottom plate has a plurality of exposed equally spaced parallel transversely extending conductors permanently affixed to the upper surface thereof; and the top plate has a plurality of exposed equally spaced parallel longitudinally extending conductors affixed to the lower surface thereof. The top plate is placed over, and supported by the bottom plate with a sheet of sensitized plotting paper removably interposed therebetween so that the conductors carried by the bottom plate are in contact with the under surface of the plotting sheet, and the conductors carried by the top plate are in contact with the upper surface of the plotting sheet. When the top and bottom plates are in operative position with respect to each other the conductors carried by the respective plates are arranged in Cartesian coordinate formation.

The conductors carried by the bottom plate, which may be termed the ordinate axis coordinates, are each connected to the positive side of a voltage source by individual conductors having a normally open switch interposed therein; and the conductors carried by the top plate, which may be termed the abscissa axis coordinates, are each connected to the negative side of the said voltage source by individual conductors having a normally open switch interposed therein. The normally open switches, interposed in the conductors between the ordinate axis conductors and the positive side of the voltage source, are all operatively connected to a computer to which information along the ordinate axis is supplied; and the switches interposed in the conductors between the abscissa axis conductors and negative side of the said voltage source are all operatively connected to a computer to which information along the abscissa axis is supplied. The varous switches are adapted to be momentarily closed in accordance with information imparted to the cooperating pair of computers. Whenever an ordinate axis switch is closed, by its associated computer, simultaneously with the closing of an abscissa switch by its associated computer, a circuit is established from and to the voltage source through the respective overlapping ordinate and abscissa axis conductors and the sensitized plotting sheet, interposed therebetween which is adapted to be marked by the passage of electric current, is marked at the point of intersection between the ordinate and abscissa conductors.

In order to simultaneously plot information supplied by a plurality of different channels of information, a plurality of similar voltage sources, switches and computers are similarly connected to each of the ordinate and abscissa axis conductors.

Having stated the principal objects of the invention other and more specific objects of the invention will be apparent from the following specification and the accompanying drawings forming a part thereof in which:

FIG. 1 is a diagrammatic view schematically illustrating the fundamental features of the construction and mode of operation of the plotting mechanism of the instant invention, and in which the mechanism is arranged for plotting a single graph in accordance with information received from a single channel of information;

FIG. 2 is a view similar to FIG. 1 showing the mechanism arranged for simultaneously plotting a plurality of graphs in accordance with information received from a plurality of different channels of information;

FIG. 3 is a vertical section through a plotting mechanism constructed in accordance with FIGS. 1 and 2, the plane of the section being indicated by the line 3—3 on FIG. 1;

FIG. 4 is a vertical sectional view similar to FIG. 3, which is taken on the line 4—4 on FIG. 1;

FIG. 5 is a plan view of a modified type of construction, but in which the basic features of construction and mode of operation are identical with those shown and described in connection with FIGS. 1 and 2;

FIG. 6 is a vertical section through the mechanism shown in FIG. 5, the plane of the section being indicated on the line 6—6 on FIG. 5;

FIG. 7 is a vertical sectional view similar to FIG. 6, the plane of the section being indicated by the line 7—7 on FIG. 5;

FIG. 8 is a plan view showing a slightly modified form of the construction shown in FIGS. 5 to 7; and FIGS. 9, 10, 11 and 12 are vertical sectional views taken respectively on the lines 9—9, 10—10, 11—11 and 12—12 on FIG. 8.

In the drawings, which are all more or less schematic, the diameter or width of the conductor wires carried by the top and bottom plates, and the spacing thereof are greatly exaggerated, and the overall size of the plotting mechanism as a whole is greatly minimized for clearness of illustration. Acually it is contemplated that the diameter of the conductor wires be about $\frac{1}{1000}$ of an inch, the spacing thereof be about $\frac{1}{100}$ of an inch, and that the overall size of the plotting mechanism may be as large as four or five feet square.

The construction and operation of the mechanism will now be described in detail in connection with the drawing with the use of reference characters, reference being had first to FIGS. 1 to 4 of the drawings. As shown therein the mechanism comprises a bottom plate 1 and a top plate 2, each of which is preferably formed of transparent plastic electric insulating material. The bottom plate 1 is permanently secured in a rectangular frame 3, and the top plate 2 is adapted to be removably mounted in the frame 3 above the bottom plate 1. A plurality of transversely extending spaced parallel conductor wires, designated 4, 5, 6, 7, 8 and 9, are embedded in the upper surface 10 of the bottom plate 1 with a portion of the upper surfaces thereof exposed; and a plurality of longitudinally extending spaced parallel similar conductor wires, designated 11, 12, 13, 14, 15 and 16, are similarly embedded in the lower surface 17 of the top plate 2 with a portion of the lower surfaces thereof exposed. When the top plate 2 is mounted in operative position in the frame 3 over the bottom plate 1 the conductor wires carried by the two plates are arranged in Cartesian coordinate formation as clearly shown in FIGS. 1 and 2. Hereinafter the conductor wires 4 to 9 inclusive mounted on the bottom plate 1 will be referred to as the ordinate conductors, and the conductor wires 11 to 16 inclusive mounted on the top plate 2 will be referred to as the abscissa conductors.

A sheet of sensitized plotting paper 18 is removably interposed between the bottom and top plates 1 and 2 with the under surface thereof in contact with the ordinate conductors 4 to 9 carried by the bottom plate 1, and the upper surface thereof in contact with the abscissa conductors carried by the top plate 2. The weight of the top plate 2, resting on the plotting sheet 18, maintains both the ordinate and the abscissa conductors in firm contact with the respective sides of the sheet 18.

Referring now to FIG. 1, in which the mechanism is shown as arranged for plotting a single graph in accordance with information received from a single channel of information, the ordinate conductors 4 to 9 inclusive are each respectively connected to one side of a voltage source 19 by individual branch conductors 24, 25, 26, 27, 28 and 29 and a main conductor 30; and the abscissa conductors 11 to 16 inclusive are each respectively connected to the other side of the voltage source 19 by individual branch conductors 31, 32, 33, 34, 35 and 36 and a main conductor 37. Normally open switches 44, 45, 46, 47, 48 and 49 are respectively interposed in the branch conductors 24 to 29 inclusive; and normally open switches 51, 52, 53, 54, 55 and 56 are respectively interposed in the branch conductors 31 to 36 inclusive. A pair of similar cooperating computers 38 and 39, to which information from a single channel of information is adapted to be imparted through an input lead 40, are provided. The computer 38 is connected to each of the ordinate switches 44 to 49 inclusive by individual switch actuators 64, 65, 66, 67, 68 and 69 respectively; and the cooperating computer 39 is connected to each of the abscissa switches 51 to 56 inclusive by individual switch actuators 71, 72, 73, 74, 75 and 76 respectively. The switch actuators 64 to 69 and 71 to 76 may be either mechanical or electrical depending on the type of computers 38 and 39 used. The computer 38 is adapted to successively momentarily close selected ones of the ordinate switches 44 to 49, and the computer 39 is adapted to successively simultaneously momentarily close selected ones of the abscissa switches 51 to 56, both in accordance with information being supplied to the computers 38 and 39 through the input lead 40. The simultaneous momentary closing of an ordinate switch and an abscissa switch establishes a closed circuit from the voltage source 19 through the ordinate and abscissa conductors to which the selected switches are respectively connected, thereby causing a visible mark to be made on the plotting sheet 18 at the point of intersection of the ordinate conductor with the abscissa conductor.

As an example let it be assumed that the pair of switches 45 and 55 were first momentarily closed, then the pair of switches 46 and 53, next the pair of switches 47 and 54, and finally the pair of switches 48 and 52. This would cause marks 77, 78, 79 and 80 to be successively made on the plotting sheet 18, first at the intersection of the conductors 5 and 15, then at the intersection of the conductors 6 and 13, next at the intersection of the conductors 7 and 14, and finally at the intersection of the conductors 8 and 12, thereby plotting the graph 81.

Reference will now be had to FIG. 2 in which the mechanism is shown as arranged for the simultaneous plotting of three different graphs in accordance with information simultaneously received from three different channels of information. In addition to the voltage source 19, the cooperating computers 38 and 39, and the various connections thereof with the ordinate and abscissa conductors as shown in FIG. 1, the mechanism shown in FIG. 2 is also provided with two additional independent voltage sources 82 and 83 and two additional pairs of cooperating computers, 84 and 85 and 86 and 87, respectively. On one side of the voltage source 82 is connected to the ordinate conductors, 4 to 9, by a main conductor 88 and a plurality of switch interposed branch conductors, similar to the switch interposed branch conductors 24 to 29; and the other side of the voltage source 82 is connected to the abscissa conductors 11 to 16 by a main conductor 89 and a plurality of switch interposed branch conductors, similar to the switch interposed branch conductors 31 to 36. One side of the voltage source 83 is similarly connected to the ordinate conductors 4 to 9 by a main conductor 90 and a plurality of switch interposed branch conductors, and the other side of the voltage source 83 is similarly connected to the abscissa conductors 11 to 16 by a main conductor 91 and a plurality of switch interposed branch conductors.

The computer 84 is connected to the normally open ordinate switches interposed between the voltage source 82 and the ordinate conductors 4 to 9 by individual switch actuators similar to the switch actuators 64 to 69; and the cooperating computer 85 is connected to the normally open abiscissa switches interposed between the voltage source 82 and the abscissa conductors 11 to 16 by individual switch actuators similar to the switch actuators 71 to 76. The computer 85 is similarly connected to the normally open ordinate switches interposed between the voltage source 83 and the ordinate conductors 4 to 9 by individual switch actuators, and the cooperating computer 86 is similarly connected to the normally open abscissa switches interposed between the voltage source 83 and the abscissa conductors 11 to 16 by individual switch actuators.

The cooperating pair of computers 84 and 85 are adapted to have information from one channel of information simultaneously supplied thereto through an input lead 92; and the cooperating pair of computers 86 and 87 are adapted to have information from another channel of information simultaneously supplied thereto through an input lead 93. The computer 84, of the cooperating pair of computers 84 and 85, is adapted to successively momentarily close selected ones of the ordinate switches interposed between the voltage source 82 and the ordinate conductors 4 to 9, and the cooperating computer 85 is adapted to simultaneously momentarily successively close selected ones of the abscissa switches interposed between the voltage source 82 and the abscissa conductors 11 to 16, in accordance with information supplied thereto from their connected channel of information. The computer 86, of the cooperating pair of computers 86 and 87, is adapted to successively momentarily close selected ones of the ordinate switches interposed between the voltage source 83 and the ordinate conductors 4 to 9, and the cooperating computer 87 is adapted to simultaneously momentarily successively close selected ones of the abscissa switches interposed between the voltage source 83 and the abscissa conductors 11 to 16, in accordance with information supplied thereto from their connected channel of information. The operation of each of the three pairs of cooperating computers 38 and 39, 84 and 85, and 86 and 87, respectively, is exactly the same as that described in connection with FIG. 1 and the cooperating pair of computers 38 and 39.

Reference will now be had to FIGS. 5 to 7 in which a modified detail type of construction is shown, but in which the basic features of construction and mode of operation as shown and described in connection with FIGURE 1 are retained. As shown therein the bottom plate 1 is provided with an extension 100 which extends outwardly from under the top plate 2 at one edge 101 thereof; and the top plate 2 is provided with an extension 103 which extends downwardly and then outwardly therefrom adjacent one edge 102 of the bottom plate 1. The end sections 104, 105, 106, 107, 108 and 109, of the ordinate conductors 4 to 9 respectively, which are affixed to the upper surface of the bottom plate 1 are exposed; and the end sections 111, 112, 113, 114, 115 and 116, of the abscissa conductors 11 to 16 respectively, which are affixed to the upper surface of the top plate extension 103 are exposed. Three spaced parallel lead screws 117, 118 and 119, which are suitably mounted in the frame 3, extend transversely across the exposed sections 104 to 109 of the ordinate conductors 4 to 9; and three spaced parallel cooperating lead screws 120, 121 and 122, which are also suitably rotatably mounted in the frame 3, extend transversely across the exposed sections 111 to 116 of the abscissa conductors 11 to 16. The ordinate lead screws 117, 118 and 119 are adapted to be respectively rotated in either direction by actuators 123, 124 and 125; and the cooperating abscissa lead screws 120, 121 and 122 are adapted to be respectively rotated in either direction by actuators 126, 127 and 128.

A contactor 129, which is mounted on the lead screw 117, is adapted to be driven back and forth by the lead screw 117 into and out of contact with successive exposed sections 104 to 109 of the ordinate conductors 4 to 9; and a cooperating contactor 130, which is mounted on the lead screw 120, is adapted to be driven back and forth by the lead screw 120 into and out of contact with successive exposed sections 111 to 116 of the abscissa conductors 11 to 16. A contactor 131, which is mounted on the lead screw 118, is adapted to be driven back and forth by the lead screw 118 into and out of contact with successive exposed sections 104 to 109 of the ordinate conductors 4 to 9; and a cooperating contactor 132, which is mounted on the lead screw 121, is adapted to be driven back and forth by the lead screw 121 into and out of contact with successive exposed sections 111 to 116 of the abscissa conductors 11 to 16. A contactor 133, which is mounted on the lead screw 119, is adapted to be driven back and forth by the lead screw 119 into and out of contact with successive exposed sections 104 to 109 of the ordinate conductors 4 to 9; and a cooperating contactor 134, which is mounted on the lead screw 122, is adapted to be driven back and forth by the lead screw 122 into and out of contact with successive exposed sections 111 to 116 of the abscissa conductors 11 to 16.

One side of the voltage source 19 is connected to the ordinate contactor 129 by a conductor 135 having a normally open switch 136 interposed therein, and the other side of the voltage source 19 is connected to the cooperating abscissa contactor 130 by a conductor 137 having a normally open switch 138 interposed therein. One side of the voltage source 82 is connected to the ordinate contactor 131 by a conductor 139 having a normally open switch 140 interposed therein, and the other side of the voltage source 82 is connected to the cooperating abscissa contactor 132 by a conductor 141 having a normally open switch 142 interposed therein. One side of the voltage source 83 is connected to the ordinate contactor 133 by a conductor 143 having a normally open switch 144 interposed therein, and the other side of the voltage source 83 is connected to the cooperating abscissa contactor 134 by a conductor 145 having a normally open switch 146 interposed therein.

The ordinate computer 38 is operatively connected to the ordinate actuator 123 by a conductor 147, and to the normally open ordinate switch 136 by a switch actuator 148; and the cooperating abscissa computer 39 is operatively connected to the abscissa actuator 126 by a conductor 149, and to the normally open abscissa switch 138 by a switch actuator 150. The ordinate computer 84 is operatively connected to the ordinate actuator 124 by a conductor 151, and to the normally open ordinate switch 140 by a switch actuator 152; and the cooperating abscissa computer 85 is operatively connected to the abscissa actuator 127 by a conductor 153, and to the normally open abscissa switch 142 by a switch actuator 154. The ordinate computer 86 is operatively connected to the ordinate actuator 125 by a conductor 155, and to the normally open switch 144 by a switch actuator 156; and the cooperating abscissa computer 87 is operatively connected to the abscissa actuator 128 by a conductor 157, and to the normally open abscissa switch 146 by a switch actuator 158.

The ordinate computer 38 is operative, through the actuator 123, to successively effect the movement of the ordinate contactor 129 into contact with selected ones of the exposed sections 104 to 109 of the ordinate conductors 4 to 9, and to momentarily close the switch 136 whenever the contactor 129 is in contact with a selected ordinate conductor; and the cooperating abscissa computer 39 is operative, through the actuator 126, to simultaneously successively effect the movement of the cooperating abscissa contactor 130 into contact with selected ones of the exposed sections 111 to 116 of the abscissa conductors 11 to 16, and to momentarily close the switch 138 whenever the contactor 130 is in contact with an abscissa conductor, all in accordance with information supplied to the cooperating computers 38 and 39 by one channel of information which is connected thereto.

The cooperating ordinate and abscissa computers 84 and 85 are operative, in a similar manner, to control the movement of the cooperating ordinate and abscissa contactors 131 and 132 and the momentary closing of the ordinate and abscissa switches 140 and 142, in accordance with information imparted thereto from another channel of information which is connected to the cooperating computers 84 and 85; and the cooperating ordinate and abscissa computers 86 and 87 are also operative, in a similar manner, to control the movement of the cooperating ordinate and abscissa contactors 133 and 134 and the momentary closing of the ordinate and abscissa switches 144 and 146, in accordance with information imparted thereto from still another channel of information which is connected to the cooperating computers 86 and 87.

Otherwise the operation of the mechanism shown in FIGS. 5 to 7 is identical with that described in connection with FIGS. 1 to 4.

FIGS. 8 to 12 inclusive disclose a slight modification of the mechanism shown in FIGS. 5 to 7. As shown in FIGS. 8 to 12 the extensions 100 and 103 of the bottom and top plates 1 and 2 are extended vertically downwardly from their respective bottom and top plates, instead of horizontally outwardly therefrom. Also the ordinate lead screws 117, 118 and 119 are disposed in a vertical plane adjacent to and parallel to the bottom plate extension 100, and the abscissa lead screws 120, 121 and 122 are disposed in vertical plane adjacent to and parallel to the top plate extension 103. Otherwise the construction and operation of the modification shown in FIGS. 8 to 12 is identical with that shown and described in connection with FIGS. 5 to 7, and the same reference numerals have been applied to like parts in FIGS. 5 to 7 and in FIGS. 8 to 12.

The sheet of plotting paper 18 may be calibrated in various different ways in accordance with the type of information to be plotted. For example if the path of a moving vehicle is to be plotted the plotting sheet could be first calibrated in degrees of latitude and longitude, or it could be calibrated in terms of distance and time.

Throughout the drawings, for the purpose of simplification and clarity of illustration and description, individual pairs of cooperating ordinate and abscissa computers have been provided for each different channel of information to be simultaneously plotted. However, such a specific arrangement of computers is not essential to the invention as various other types of computers are available which could be used equally well. A single computer could be provided, for each channel of information, which would be operative to control the energization of both the ordinate and abscissa conductors; or a single computer of the time sharing type could be used for all channels of information to be simultaneously plotted. When a plurality of individual computers, such as shown herein, are used, it is contemplated that they will all be combined into a single package. It is therefore to be understood that throughout the appended claims the term "computer means" is intended to apply to any type, or combination of computers, that can be used in connection with the invention.

From the foregoing it will be apparent to those skilled in this art that I have provided a very simple and efficient mechanism for accomplishing the objects of the invention.

It is to be understood that I am not limited to the specific construction shown and described herein as various modifications can be made therein within the spirit of the invention and the scope of the appended claim. For instance, although only three channels of information are shown as connected to the plotting mechanism, it is believed obvious that many more channels of information could be similarly connected thereto. Also the ordinate and abscissa conductors could be of the printed conductor type instead of the conductor wires shown. And the ordinate and abscissa conductors do not have to be arranged in the Cartesian coordinate system shown as they can be arranged as polar coordinates or hyperbolic coordinates. Also a variety of warped coordinate systems are feasible. It is only essential that the conductors carried by the top plate intersect the conductors carried by the bottom plate where a mark on the sensitized plotting paper would be desired.

What is claimed is:

A plotting mechanism comprising a lower layer having a plurality of elongated spaced conductors, an upper layer having a plurality of elongated laterally spaced conductors, said upper layer of conductors being disposed transversely of said lower layer of conductors with each of the conductors of said upper layer intersecting each of the conductors of said lower layer of conductors, a sensitized sheet of plotting paper removably interposed between said lower and upper layers of conductors with the conductors of said upper layer of of conductors in contact with the top surface of said sheet and with the conductors of said lower layer of conductors in contact with the bottom surface of said sheet, a plurality of potential sources, one end of each of the conductors in the upper and lower layers of conductors having a plurality of branch conductors and a separate switch to connect each potential source to each conductor through one only of said branch conductors.

References Cited by the Examiner
UNITED STATES PATENTS

| | | | |
|---|---|---|---|
| 2,704,305 | 3/55 | McLaughlin et al. | 235—197 |
| 2,763,854 | 9/56 | Oliwa | 235—177 |
| 2,869,965 | 1/59 | Willard | 346—74 |
| 2,904,626 | 9/59 | Rajchman et al. | 340—174 |
| 2,938,185 | 5/60 | Dill | 235—197 |

IRVING L. SRAGOW, *Primary Examiner.*

WALTER W. BURNS, Jr., *Examiner.*